(12) United States Patent
Sachdev et al.

(10) Patent No.: US 11,031,161 B2
(45) Date of Patent: Jun. 8, 2021

(54) METHOD OF MANUFACTURING A BULK NITRIDE, CARBIDE, OR BORIDE-CONTAINING MATERIAL

(71) Applicant: GM GLOBAL TECHNOLOGY OPERATIONS LLC, Detroit, MI (US)

(72) Inventors: Anil K. Sachdev, Rochester Hills, MI (US); Frederick E. Pinkerton, Shelby Township, MI (US); Raja K. Mishra, Shelby Township, MI (US); Tyson W. Brown, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 340 days.

(21) Appl. No.: 15/977,545

(22) Filed: May 11, 2018

(65) Prior Publication Data

US 2019/0348202 A1 Nov. 14, 2019

(51) Int. Cl.
*H01F 1/03* (2006.01)
*B29C 64/268* (2017.01)
*B33Y 80/00* (2015.01)
*C01B 21/06* (2006.01)

(52) U.S. Cl.
CPC .......... *H01F 1/0311* (2013.01); *B29C 64/268* (2017.08); *B33Y 80/00* (2014.12); *C01B 21/0622* (2013.01)

(58) Field of Classification Search
CPC ............... C01B 21/0622; H01F 1/0311; H01F 41/0253; B23K 15/086; B22F 3/1055; B22F 2003/1057; B28B 1/001
See application file for complete search history.

(56) References Cited

U.S. PATENT DOCUMENTS

| 5,211,768 A | * | 5/1993 | Preisser | .................... C23C 8/26 |
| | | | | 148/212 |
| 5,805,971 A | * | 9/1998 | Akedo | .................... B22F 3/115 |
| | | | | 419/6 |
| 2006/0283290 A1 | * | 12/2006 | Hattori | ............... G11B 5/70626 |
| | | | | 75/348 |

(Continued)

FOREIGN PATENT DOCUMENTS

| CN | 105855544 | * | 4/2016 |
| DE | 102014104997 | * | 9/2015 |
| WO | WO2018029468 | * | 2/2018 |

*Primary Examiner* — Nicholas A Wang
(74) *Attorney, Agent, or Firm* — Quinn IP Law

(57) ABSTRACT

A three-dimensional object made of a bulk nitride, carbide, or boride-containing material may be manufactured using a powder bed fusion additive manufacturing technique. A layer of powder feed material may be distributed over a solid substrate and scanned with a high-energy laser beam to locally melt selective regions of the layer and form a pool of molten feed material. The pool of molten feed material may be exposed to gaseous nitrogen, carbon, or boron to respectively dissolve nitride, carbide, or boride ions into the pool of molten feed material to produce a molten nitrogen, carbon, or boron-containing solution. The molten nitrogen, carbon, or boron-containing solution may cool and solidify into a solid layer of fused nitride, carbide, or boride-containing material. In one form, the three-dimensional object may comprise a permanent magnet made up of a plurality of solid layers of fused iron nitride material having a magnetic $Fe_{16}N_2$ phase.

18 Claims, 2 Drawing Sheets

(56) References Cited

U.S. PATENT DOCUMENTS

| | | | | |
|---|---|---|---|---|
| 2017/0182558 A1* | 6/2017 | Shimizu | .................. | B23K 26/60 |
| 2017/0197278 A1* | 7/2017 | Garry | .................... | B29C 64/268 |
| 2018/0122570 A1* | 5/2018 | Li | ......................... | H01F 1/0578 |
| 2018/0311736 A1* | 11/2018 | Pawlikowski | ........ | B22F 3/1007 |
| 2019/0299290 A1* | 10/2019 | Kuhns | ..................... | B22F 7/002 |

* cited by examiner

METHOD OF MANUFACTURING A BULK NITRIDE, CARBIDE, OR BORIDE-CONTAINING MATERIAL

INTRODUCTION

Nitride, carbide, and borides of metals and non-metals are an attractive class of materials due to their wide range of mechanical, electrical, thermal, and magnetic properties. Of these materials, iron nitride ($Fe_{16}N_2$) is of particular interest as a magnetic material due to its exceptionally large theoretical maximum magnetic energy product, (BH)max. However, the manufacture of a bulk $Fe_{16}N_2$ material has proved difficult due to the tendency of a competing $Fe_8N$ phase to form within the bulk material and significantly impair the overall magnetic properties of the material. Therefore, there is a need in the art for a method of manufacturing a bulk iron nitride material that favors the formation of a magnetic $Fe_{16}N_2$ phase within the bulk material, instead of the competing $Fe_8N$ phase.

SUMMARY

A three-dimensional object made of a bulk nitride, carbide, or boride-containing material may be manufactured using a powder bed fusion additive manufacturing technique. In step (a), a powder feed material may be provided. In step (b), a layer of the powder feed material may be distributed over a solid substrate. In step (c), selective regions of the layer of the powder feed material may be scanned with a high-energy laser beam to locally melt the selective regions and form a pool of molten feed material. The selective regions of the layer may correspond to a cross-section of a three-dimensional object being formed. In step (d), the pool of molten feed material may be exposed to gaseous nitrogen, carbon, or boron to respectively dissolve nitride, carbide, or boride ions into the pool of molten feed material to produce a molten nitrogen, carbon, or boron-containing solution. In step (e), the laser beam may be terminated to cool and solidify the molten nitrogen, carbon, or boron-containing solution into a solid layer of fused nitride, carbide, or boride-containing material. Steps (b) through (e) may be repeated to form a three-dimensional object made up of a plurality of solid layers of fused nitride, carbide, or boride-containing material.

In step (d), a gas stream may be directed at the pool of molten feed material. The gas stream may comprise at least one of urea ($CO(NH_2)_2$), ammonia ($NH_3$), nitrogen ($N_2$), or methane ($CH_4$).

Steps (b) through (f) may be performed within a chamber. In such case, in step (d), a nitrogen, carbon, or boron-containing gas may be introduced into the chamber. In one form, a high-pressure environment may be established within the chamber, which may exhibit at a pressure in the range of 150 kPa to 150 MPa. In another form, a subatmospheric pressure environment may be established within the chamber and an electric field may be generated within the chamber to ionize the nitrogen, carbon, or boron-containing gas and transform the gas into a plasma. In addition, an electric potential difference may be established between the solid substrate and the plasma to attract nitrogen ions, carbon ions, or boron ions to the pool of molten feed material.

When the selective regions of the layer are scanned with the laser beam, a volume of solid material underlying the selective regions of the layer may not melt and may be maintained at a temperature less than 500° C. In such case, upon termination of the laser beam, the pool of molten feed material may be quenched by heat transfer from the pool of molten feed material to the volume of solid material underlying the selective regions of the layer.

Upon termination of the laser beam, the pool of molten feed material may be cooled at a rate in the range of $10^4$ Kelvin per second to $10^6$ Kelvin per second.

During formation of the plurality of solid layers of fused nitride, carbide, or boride-containing material, thermal gradients may be repeatedly generated within the solid layers such that the three-dimensional object made up of the plurality of solid layers exhibits localized regions of residual stress.

The powder feed material may comprise at least one element selected from the group consisting of iron (Fe), titanium (Ti), and silicon (Si). In such case, each particle of the powder feed material may comprise the at least one element in an amount, by weight, greater than or equal to 90%. The powder feed material also may comprise at least one nonmetal element selected from the group consisting of nitrogen, carbon, or boron. In such case, each particle of the powder feed material may comprise the at least one nonmetal element in an amount, by weight, less than or equal to 5%.

In one form, the powder feed material may comprise iron (Fe), the pool of molten feed material may be exposed to gaseous nitrogen in step (d) to produce a molten solution of iron and nitrogen, and the three-dimensional object formed in step (f) may be a permanent magnet made up of a plurality of solid layers of fused iron nitride material. The iron nitride material may comprise a magnetic $Fe_{16}N_2$ phase. The iron nitride material may comprise, on an atomic basis, greater than 10% nitrogen and the magnetic $Fe_{16}N_2$ phase may exhibit a body-centered tetragonal (bct) crystal structure. During formation of the plurality of solid layers of fused iron nitride material, thermal gradients may be repeatedly generated within the solid layers such that the three-dimensional object exhibits localized strains in the range of 0.5% to 1%. The localized strains may promote formation and stabilization of the magnetic $Fe_{16}N_2$ phase.

In another form, the powder feed material may comprise an alloy of iron (Fe) and carbon (C), the pool of molten feed material may be exposed to gaseous nitrogen or carbon in step (d), and the three-dimensional object formed in step (f) may be made up of a plurality of solid layers of hardened steel. The hardened steel may exhibit a body-centered cubic crystal structure or a face-centered cubic crystal structure and may comprise, by weight, 0.1% to 4% carbon and 0.01% to 0.5% nitrogen.

The three-dimensional object may comprise a solid exterior and a porous interior enclosed within the solid exterior.

After step (f), the three-dimensional object may be exposed to gaseous nitrogen, carbon, or boron to increase the respective concentration of nitrogen, carbon, or boron within the solid layers of fused nitride, carbide, or boride-containing material. In such case, the three-dimensional object may comprise a plurality of flow-through channels defined by walls having wall surfaces and the gaseous nitrogen, carbon, or boron may be directed through the flow-through channels in the three-dimensional object such that the gaseous nitrogen, carbon, or boron contacts the wall surfaces and promotes dissolution of nitride, carbide, or boride ions into the solid layers of fused nitride, carbide, or boride-containing material.

A three-dimensional permanent magnet may be manufactured using a powder bed fusion additive manufacturing technique. In step (a), an iron-based powder feed material may be provided. In step (b), a layer of the powder feed material may be distributed over a solid substrate. In step (c), selective regions of the layer of the powder feed material may be scanned with a high-energy laser beam to locally melt the selective regions and form a pool of molten feed material. The selective regions of the layer may correspond to a cross-section of a three-dimensional object being formed. In step (d), the pool of molten feed material may be exposed to gaseous nitrogen to dissolve nitride ions into the pool of molten feed material. In step (e), the laser beam may be terminated to cool and solidify the pool of molten feed material into a solid layer of fused iron nitride material. In step (f), steps (b) through (e) may be repeated to form a three-dimensional object made up of a plurality of solid layers of fused iron nitride material. The fused iron nitride material may comprise, on an atomic basis, greater than 10% nitrogen. In addition, the fused iron nitride material may comprise a magnetic $Fe_{16}N_2$ phase exhibiting a body-centered tetragonal (bct) crystal structure.

During formation of the plurality of solid layers of fused iron nitride material, thermal gradients may be repeatedly generated within the solid layers such that the three-dimensional object exhibits localized strains in the range of 0.5% to 1%. The localized strains may promote formation and stabilization of the magnetic $Fe_{16}N_2$ phase.

The three-dimensional object may be V-shaped, W-shaped, trapezoid-shaped, or helical in shape.

DETAILED DESCRIPTION

In the presently disclosed methods, a powder bed fusion additive manufacturing technique is used to build up three-dimensional objects made of bulk nitride, carbide, and/or boride-containing materials by introducing nitride, carbide, and/or boride ions into a transient volume of molten feed material that is produced as a high-energy laser beam scans selective regions of a powder feed material layer to fuse the regions into a one-piece unitary structure. In one form, a three-dimensional object made of a bulk iron nitride material may be produced that includes a relatively high concentration of nitrogen (e.g., greater than 10 at %) and exhibits a magnetic $Fe_{16}N_2$ phase. In such case, thermal gradients generated within the three-dimensional object during manufacture thereof may lead to local residual stresses in the object that help promote formation and stabilization of the magnetic $Fe_{16}N_2$ phase. In another form, a three-dimensional object made of a bulk iron (Fe), titanium (Ti), or silicon (Si)-based material may be produced that includes a relatively low concentration of nitride, carbide, and/or boride ions (e.g., less than 5 wt %). In such case, the nitride, carbide, and/or boride ions may be dissolved in solid solution with the iron (Fe), titanium (Ti), or silicon (Si) and may help increase the strength of the bulk iron (Fe), titanium (Ti), or silicon (Si)-based material.

Figure 1:
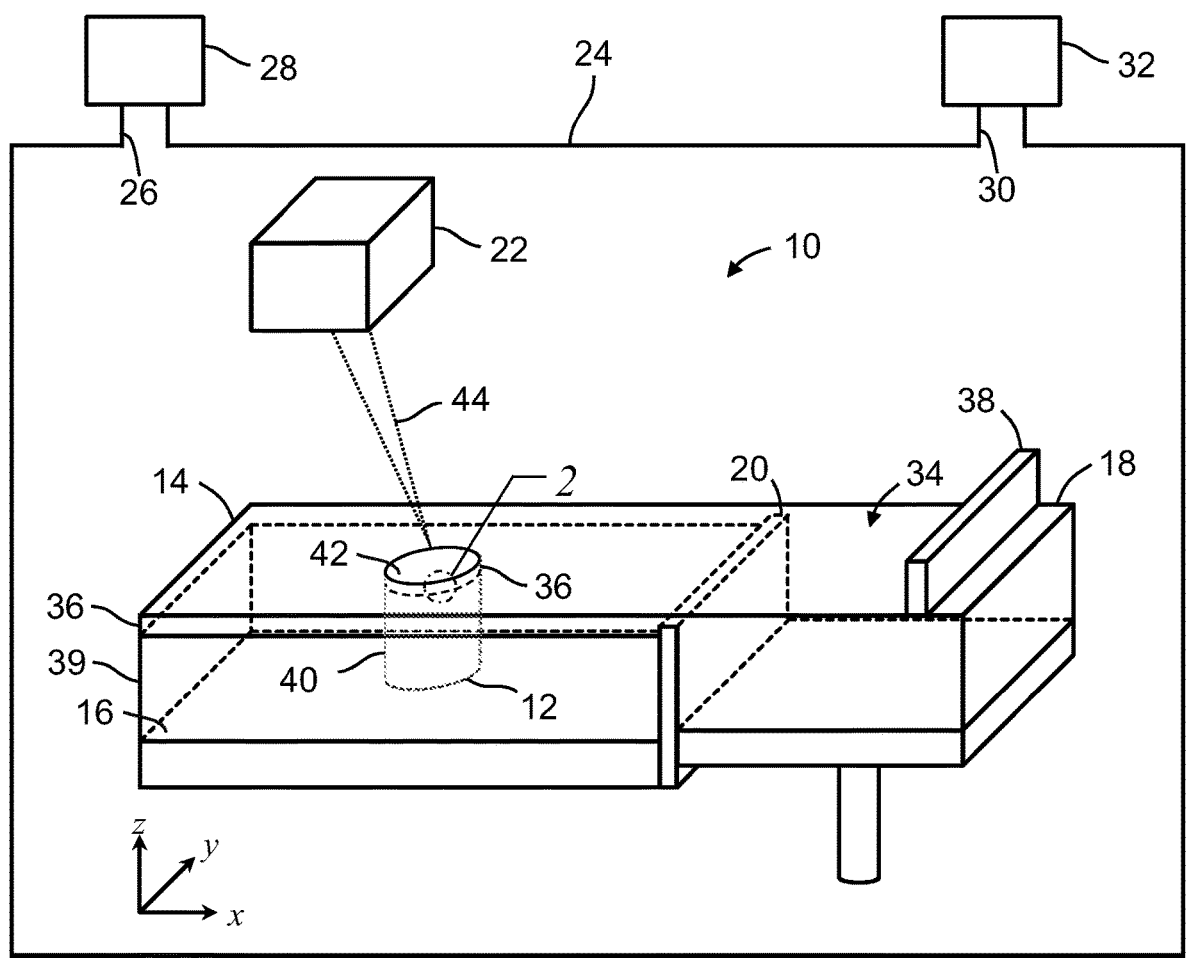
FIG. 1 is a schematic perspective view of an apparatus for manufacturing three-dimensional objects made of bulk nitride, carbide, and/or boride-containing materials using a powder bed fusion additive manufacturing technique, in accordance with one embodiment of the present disclosure.

FIG. 1 depicts an apparatus 10 that can be used to manufacture a three-dimensional object 12 made of a bulk nitride, carbide, and/or boride-containing material using a powder bed fusion additive manufacturing technique in which digital design data is used to build up the object 12 layer by layer. The apparatus 10 depicted in FIG. 1 is configured to build up the object 12 using a selective laser melting technique and includes a building chamber 14 including a building platform 16, a powder feed material reservoir 18 separated from the building chamber 14 by a weir 20, and a high-power laser beam source 22. The apparatus 10 may be enclosed within a chamber 24. The chamber 24 may include an inlet 26 coupled to a source of gaseous nitrogen, carbon, and/or boron 28 and an outlet 30 coupled to a vacuum pump and evacuation system 32.

In a first stage of the process, a volume of powder feed material 34 is charged into the powder feed material reservoir 18 and distributed over an upper surface of the building platform 16 to form a layer 36 of the powder feed material 34. The powder feed material 34 may be distributed over the upper surface of the building platform 16, for example, by a blade 38. In addition, depending upon shape of the three-dimensional object 12 being formed and the stage of formation, the layer 36 of the powder feed material 34 also may be distributed over a surface of one or more layers of previously deposited unmelted powder feed material 39 and/or over a surface of one or more previously deposited melted, fused, and solidified nitride, carbide, and/or boride material layers 40. In FIG. 1, the layer 36 of the powder feed material 34 is distributed over the upper surface of the building platform 16 and also over a surface of multiple previously melted, fused, and solidified nitride, carbide, and/or boride material layers 40.

The powder feed material 34 comprises at least one element that can react with gaseous nitrogen, carbon, and/or boron to form a nitride, carbide, and/or boride compound or a nitrogen, carbon, and/or boron-containing solid solution. For example, the powder feed material 34 may comprise a metal, e.g., iron (Fe) and/or titanium (Ti), and/or a semimetal (also referred to as a metalloid), e.g., silicon (Si). Such metals and/or metalloids may account for, by weight, greater than 90% or, more preferably, greater than 99% of the powder feed material 34. For example, in one form, the powder feed material 34 may comprise, by weight, greater than or equal to 99.8% iron. In some embodiments, the powder feed material 34 also may comprise one or more nonmetals, e.g., nitrogen, carbon, and/or boron. When present, the one or more nonmetals may account for, by weight, less than or equal to 10%, less than or equal to 5%, or, more preferably, less than or equal to 1% of the powder feed material 34. In one specific example, the powder feed material 34 may comprise, by weight, 99.95-99.99% iron and 0.05-0.01% nitrogen. The powder feed material 34 may have a mean particle diameter in the range of 1 micrometer to 100 micrometers and the layer 36 of the powder feed material 34 may have a thickness in the range of 5 micrometers to 100 micrometers.

After the layer 36 of the powder feed material 34 is distributed over the building platform 16, selective regions 42 of the layer 36 are scanned by a high-energy laser beam 44. During the scanning process, the laser beam 44 impinges the layer 36 and is advanced relative to a plane defined by an upper surface of the layer 36 along one or more pre-defined travel paths. The laser beam 44 may be a pulsed or continuous wave laser beam having a power in the range of 100 W to 2000 W, a laser beam spot size in the range of 50

μm to 250 μm, and a velocity in the range of 0.5 meters per second to 10 meters per second.

Figure 2:
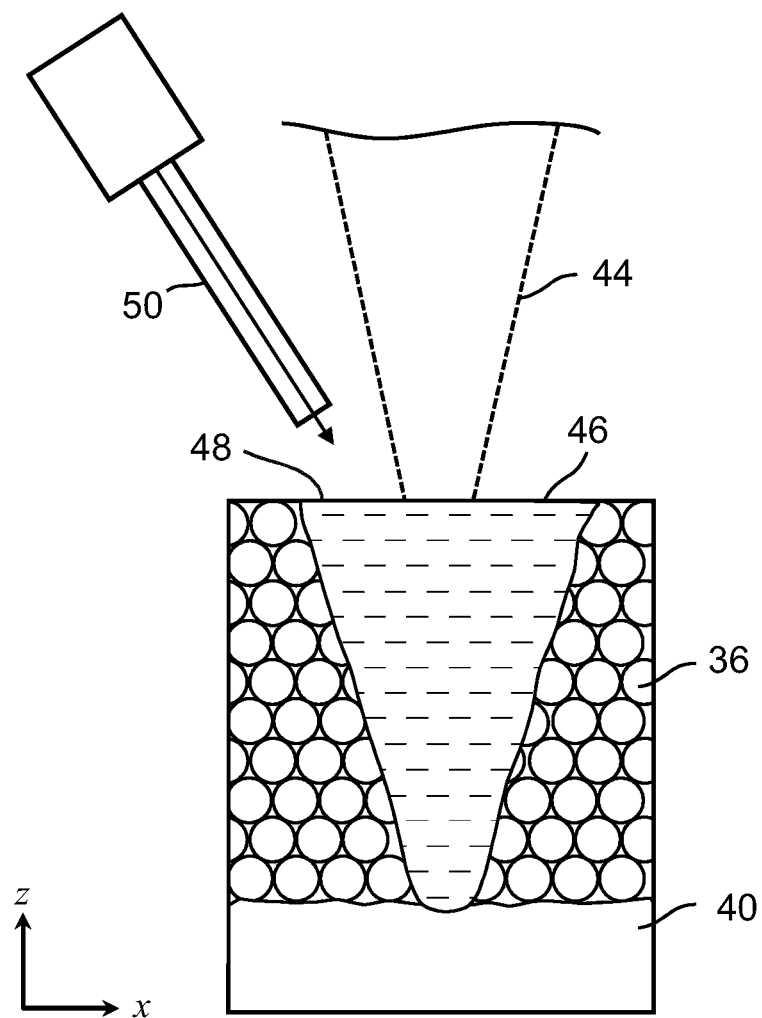
FIG. 2 is a magnified view of a laser beam impinging upon a layer of powder feed material distributed over a previously melted, fused, and solidified layer of feed material on a building platform of the apparatus of FIG. 1.

As shown in FIG. 1, the selective regions 42 of the layer 36 scanned by the laser beam 44 correspond to a cross-section of the three-dimensional object 12 being formed. As best shown in FIG. 2, as the laser beam 44 scans the selective regions 42 of the layer 36, the laser beam 44 impinges the layer 36 and heat generated by absorption of energy from the laser beam 44 initiates localized melting and fusion of the powder feed material 34 within the selective regions 42 of the layer 36. As a result, a pool 46 of molten feed material is created that fully penetrates the layer 36 and extends through the layer 36 in a direction substantially perpendicular to the surface of the building platform 16 (i.e., along the z-axis). As shown, the pool 46 of molten feed material also may extend at least partially into one of the underlying layers 40, for example, at a depth of less than 100 micrometers.

A volume of material underlying the pool 46 of molten feed material does not melt and is maintained in solid form at a temperature of less than 500° C. as the laser beam 44 scans the selective regions 42 of the layer 36. Depending upon shape of the three-dimensional object 12 being formed and the stage of formation, this volume of material underlying the pool 46 may comprise a volume of unmelted powder feed material 39, a volume of previously deposited melted, fused, and solidified nitride, carbide, and/or boride-containing material 40, and/or the building platform 16 itself. As the laser beam 44 scans the selective regions 42 of the layer 36 and is advanced relative to the upper surface of the layer 36 along the one or more predefined travel paths, the pool 46 of molten feed material follows and leaves behind a trail of molten feed material in the wake of the advancing laser beam 44. This molten feed material is quenched and rapidly solidifies by heat transfer from the pool 46 of molten feed material to the volume of solid material underlying the pool 46. For example, the pool 46 of molten feed material may cool at a rate in the range of $10^4$ Kelvin per second to $10^6$ Kelvin per second in the wake of the advancing laser beam 44.

The pool 46 of molten feed material may be exposed to gaseous nitrogen, carbon, and/or boron as the laser beam 44 scans the selective regions 42 of the layer 36 to respectively dissolve nitride, carbide, and/or boride ions into the pool 46 of molten feed material. Dissolution of the nitride, carbide, and/or boride ions into the pool 46 of molten feed material transforms the pool 46 into a molten nitrogen, carbon, and/or boron-containing solution. For example, in embodiments where the powder feed material 34 comprises iron, the pool 46 of molten feed material may be exposed to gaseous nitrogen to dissolve nitride ions into the pool 46 and produce a molten solution of iron and nitrogen. Because the pool 46 of molten feed material rapidly solidifies in the wake of the advancing laser beam 44, the pool 46 of molten feed material is only exposed to gaseous nitrogen, carbon, and/or boron for a brief duration prior to solidification. For example, the pool 46 of molten feed material may be exposed to gaseous nitrogen, carbon, and/or boron for a duration of less than one second.

As shown in FIG. 1, in one form, the pool 46 of molten feed material may be exposed to gaseous nitrogen, carbon, and/or boron by generating a gaseous nitrogen, carbon, and/or boron-containing environment within the chamber 24. A gaseous nitrogen, carbon, and/or boron-containing environment may be generated within the chamber 24, for example, by introducing a nitrogen, carbon, and/or boron-containing gas into the chamber 24 via the inlet 26. In one form, a gaseous nitrogen, carbon, and/or boron-containing environment may be generated within the chamber 24 by introducing a solid nitrogen, carbon, and/or boron-containing material into the chamber 24 and heating the solid material to release gaseous nitrogen, carbon, and/or boron therefrom. In another form, as best shown in FIG. 2, the pool 46 of molten feed material may be exposed to gaseous nitrogen, carbon, and/or boron by locally directing a stream of nitrogen, carbon, and/or boron-containing gas at a free surface 48 of the pool 46. A stream of nitrogen, carbon, and/or boron-containing gas may be directed at the free surface 48 of the pool 46, for example, by a nozzle 50. As the laser beam 44 scans the selective regions 42 of the layer 36 and is advanced relative to the upper surface of the layer 36, the nozzle 50 may be configured to track a course that corresponds to the travel path of the laser beam 44 and the pool 46 of molten feed material.

The nitrogen, carbon, and/or boron-containing gas introduced into the chamber 24 and/or directed at the free surface 48 of the pool 46 of molten feed material may comprise a nitrogen, carbon, and/or boron-containing compound that dissociates in the chamber 24 (for example, upon contact with the pool 46 of molten feed material) to produce nascent nitrogen (N), carbon (C), and/or boron (B), which can readily diffuse into the pool 46 of molten feed material. Some examples of nitrogen, carbon, and/or boron-containing compounds include urea ($CO(NH_2)_2$), ammonia ($NH_3$), nitrogen ($N_2$), and methane ($CH_4$). In some embodiments, the nitrogen, carbon, and/or boron-containing gas may comprise a mixture of one or more nitrogen, carbon, and/or boron-containing compounds and an inert carrier gas (e.g., argon or nitrogen). The partial pressure of nitrogen, carbon, and/or boron at the free surface 48 of the pool 46 of molten feed material and the duration of exposure thereto may be controlled or adjusted to achieve a desired concentration of nitrogen, carbon, and/or boron in the resulting pool 46 of molten nitrogen, carbon, and/or boron-containing solution (and thus in the resulting bulk nitride, carbide, and/or boride material of the final three-dimensional object 12).

A relatively high-pressure environment (e.g., greater than 1 atmosphere) may be produced within the chamber 24 while the laser beam 44 is scanning the selective regions 42 of the layer 36, for example, to increase the rate at which nitride, carbide, and/or boride ions diffuse into the pool 46 of molten feed material. A relatively high-pressure environment may be generated within the chamber 24, for example, by controlling of the amount of gas introduced into the chamber 24 via the inlet 26 relative to the amount of gas discharged from the chamber 24 via the outlet 30. For example, the environment within the chamber 24 may be at a pressure in the range of 150 kPa to 150 MPa while the laser beam 44 is scanning the selective regions 42 of the layer 36.

To promote the formation of nitride, carbide, and/or boride ions within the chamber 24 and dissolution of such ions into the pool 46 of molten feed material, in some instances, it may be desirable to employ a plasma ionization process. In such case, an electric field may be generated within the chamber 24 to ionize the nitrogen-, carbon-, and/or boron-containing gas and transform the gas into a plasma state. An electric field may be generated in the chamber 24, for example, by establishing an electric potential difference between the layer 36 of the powder feed material 34 and the chamber 24, which may accelerate the nitride, carbide, and/or boride ions in the ionized gas toward the pool 46 of molten feed material. A subatmospheric pressure environment (e.g., less than 1 atmosphere) may be established within the chamber 24 during the plasma ionization process, for example, by controlling of the amount of gas evacuated from the chamber 24 via the vacuum pump and evacuation system 32.

After the selective regions 42 of the layer 36 have been scanned by the high-energy laser beam 44, the laser beam 44 may be terminated. Upon termination of the laser beam 44, the pool 46 of the molten nitrogen, carbon, and/or boron-containing solution rapidly cools and solidifies to form another solidified nitride, carbide, and/or boride-containing material layer that bonds with the previously solidified layers 40. Thereafter, the reservoir 18 may be raised in a build direction (i.e., along the z-axis), or the building platform 16 may be lowered, by a thickness of the newly solidified layer. Then, a further layer of powder feed material 34 may be distributed over the surface of the building platform 16 and over the previously solidified nitride, carbide, and/or boride material layers 40, scanned with the laser beam 44 in regions corresponding to another cross-section of the three-dimensional object 12, and solidified to form yet another solidified nitride, carbide, and/or boride material layer that bonds with the previously solidified layers 40. This process is repeated until the entire three-dimensional object 12 is built up layer-by-layer. The resulting three-dimensional object 12 is of one-piece unitary construction and is made of a bulk nitride, carbide, and/or boride-containing material. For example, the three-dimensional object 12 may comprise a nitride, carbide, or boride of a metal or a metalloid, e.g., iron (Fe), titanium (Ti), or silicon (Si). Some examples of nitride, carbide, and boride-containing materials include iron nitride, silicon nitride, titanium nitride, titanium diboride, and silicon carbide.

In one form, the three-dimensional object 12 may comprise a bulk iron nitride material having a relatively high concentration of nitrogen ions (e.g., greater than 10 at %) and exhibiting a magnetic $Fe_{16}N_2$ phase. The magnetic $Fe_{16}N_2$ phase may exhibit a body-centered tetragonal (bct) crystal structure with space group $I_{4/mmm}$ (#139), lattice constants a=b=5.72 Å and c=6.29 Å, and a c/a ratio of 1.1. In one form, the three-dimensional object 12 may be a permanent magnet and the magnetic $Fe_{16}N_2$ phase may account for, by volume, 50% to 100% of the bulk iron nitride material.

In another form, the three-dimensional object 12 may comprise a bulk iron (Fe), titanium (Ti), or silicon (Si)-based material having a relatively low concentration of nitride, carbide, and/or boride (e.g., on an atomic basis, greater than 0% and less than or equal to 5%). In such case, the nitride, carbide, and/or boride ions may be dissolved in solid solution with the iron (Fe), titanium (Ti), or silicon (Si) and may harden and/or help increase the strength of the bulk iron (Fe), titanium (Ti), or silicon (Si)-based material.

In one specific example, the powder feed material 34 may comprise an alloy of iron (Fe) and 0.05 wt % to 0.4 wt % carbon (C), the pool 46 of molten feed material may be exposed to gaseous nitrogen or carbon, and the resulting three-dimensional object 12 may comprise a bulk hardened steel that exhibits a body-centered cubic crystal structure or a face-centered cubic crystal structure and comprises, by weight, 0.01% to 0.5% nitrogen and/or 0.1% to 4% carbon.

The repeated deposition, fusion, and solidification of layers of the powder feed material 34 during formation of the three-dimensional object 12 repeatedly creates thermal gradients within the nitride, carbide, and/or boride-containing material layers 40 in the build direction (i.e., along the z-axis) and produces local residual compressive and tensile stresses within the object 12 upon quenching of the pool 46 of molten feed material. As such, after formation, the three-dimensional object 12 may exhibit localized strains in the range of 0.5% to 1%. The amount of strain present in the three-dimensional object 12 may be tuned, for example, by controlling the thickness of each layer 36 of powder feed material 34 scanned by the laser beam 44, the mean particle diameter of the powder feed material 34, the shape of the particles that make up the powder feed material 34, and the power density, laser beam spot size, and/or velocity of the laser beam 44. In embodiments where the three-dimensional object 12 is made of iron nitride, the local residual stresses within the object 12 may help promote formation and stabilization of a magnetic $Fe_{16}N_2$ phase within the object 12.

In some embodiments, the three-dimensional object 12 may comprise a solid exterior and a porous interior enclosed within the solid exterior (not shown). In such case, the porous interior of the object 12 may help reduce the overall weight of the object 12 (as compared to embodiments where the object 12 is entirely solid). In one form, the porous interior of the object 12 may comprise a multidimensional stochastic or periodic support structure, which may have closed or open interconnected pores. For example, the porous interior of the object 12 may comprise a two or three-dimensional lattice support structure or truss including a plurality of repeating unit cells (e.g., a tessellation of one or more geometric shapes) defined by a plurality of discrete segments connected at their ends.

In embodiments where the three-dimensional object 12 comprises a permanent magnet exhibiting a magnetic $Fe_{16}N_2$ phase, the shape of the three-dimensional object 12 may be configured so that the object 12 exhibits certain desirable magnetic fields. For example, the three-dimensional object 12 may be V-shaped, W-shaped, trapezoid-shaped, or helical in shape.

It may be desirable to perform a nitriding, carburizing, and/or boronizing treatment on the three-dimensional object 12 after formation thereof to increase the concentration of nitrogen, carbon, and/or boron therein. In such case, the three-dimensional object 12 may be heated to a temperature in the range of 450° C. to 550° C. while exposing one or more surfaces of the three-dimensional object 12 to a nitrogen, carbon, and/or boron-containing gas at a pressure in the range of 200 kPa to 100 MPa for a duration in the range of 1 hour to 30 hours to promote diffusion of nitride, carbide, and/or boride ions into the object 12. To further promote diffusion of the nitride, carbide, and/or boride ions throughout a bulk of the object 12 (instead of only in an exterior surface portion of the object 12), one or more flow-through channels (not shown) may be formed within the three-dimensional object 12 during manufacture thereof. The one or more flow-through channels may be defined by walls having wall surfaces that extend from an exterior surface of the object 12 and through an interior of the object 12. The one or more flow-through channels increase the surface area of the object 12 that can be exposed to the nitrogen, carbon, and/or boron-containing gas during the nitriding, carburizing, and/or boronizing treatment and also may allow exposure of the nitrogen, carbon, and/or boron-containing gas to an exterior surface portion as well as an interior surface portion of the object 12.

In one form, the three-dimensional object 12 may comprise a bulk iron nitride material and a nitriding treatment may be performed on the three-dimensional object 12 after formation thereof to increase the concentration of nitrogen therein. In some embodiments, the nitriding treatment may be performed to increase the concentration of nitrogen ions within the iron nitride material to greater than 10 at % and to promote formation of a magnetic $Fe_{16}N_2$ phase within the iron nitride material. In such case, the object 12 may initially comprise an iron nitride material that exhibits a body-centered cubic crystal structure (e.g., ferrite) and/or a face-centered cubic crystal structure (e.g., martensite), and the nitriding treatment may be performed to increase the concentration of nitrogen ions within the iron nitride material and form a magnetic $Fe_{16}N_2$ phase exhibiting a body-centered tetragonal (bct) crystal structure within the iron nitride material.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing a three-dimensional object made of a bulk nitride-containing material using a powder bed fusion additive manufacturing technique, the method comprising:
   (a) providing a powder feed material including iron (Fe);
   (b) distributing a layer of the powder feed material over a solid substrate;
   (c) scanning selective regions of the layer of the powder feed material with a laser beam to locally melt the selective regions and form a pool of molten feed material, the selective regions of the layer corresponding to a cross-section of a three-dimensional object being formed;
   (d) exposing the pool of molten feed material to gaseous nitrogen to dissolve nitride ions into the pool of molten feed material to produce a molten solution of iron and nitrogen;
   (e) terminating the laser beam to cool and solidify the molten solution into a solid layer of fused iron nitride material; and
   repeating steps (b) through (e) to form a three-dimensional permanent magnet made up of a plurality of solid layers of fused iron nitride material,
   wherein the fused iron nitride material comprises a magnetic $Fe_{16}N_2$ phase, and
   wherein, during formation of the plurality of solid layers of fused iron nitride material, thermal gradients are repeatedly generated within the solid layers such that the three-dimensional permanent magnet exhibits localized strains in the range of 0.5% to 1%, and wherein the localized strains promote formation and stabilization of the magnetic $Fe_{16}N_2$ phase.

2. The method of claim 1 wherein step (d) includes:
   directing a gas stream at the pool of molten feed material, wherein the gas stream comprises at least one of urea ($CO(NH_2)_2$), ammonia ($NH_3$), or nitrogen ($N_2$).

3. The method of claim 1 wherein steps (b) through (f) are performed within a chamber, and wherein step (d) includes:
   introducing a nitrogen-containing gas into the chamber; and
   establishing a high-pressure environment within the chamber, the high-pressure environment exhibiting a pressure in the range of 150 kPa to 150 MPa.

4. The method of claim 1 wherein steps (b) through (f) are performed within a chamber, and wherein step (d) includes:
   introducing a nitrogen-containing gas into the chamber;
   generating an electric field within the chamber to ionize the nitrogen-containing gas and transform the gas into a plasma;
   establishing a subatmospheric pressure environment within the chamber; and
   establishing an electric potential difference between the solid substrate and the plasma to attract nitrogen ions to the pool of molten feed material.

5. The method of claim 1 wherein, when the selective regions of the layer are scanned with the laser beam, a volume of solid material underlying the selective regions of the layer does not melt and is maintained at a temperature less than 500° C.

6. The method of claim 5 wherein, upon termination of the laser beam, the pool of molten feed material is quenched by heat transfer from the pool of molten feed material to the volume of solid material underlying the selective regions of the layer.

7. The method of claim 1 wherein, upon termination of the laser beam, the pool of molten feed material is cooled at a rate in the range of $10^4$ Kelvin per second to $10^6$ Kelvin per second.

8. The method of claim 1 wherein, during formation of the plurality of solid layers of fused iron nitride material, thermal gradients are repeatedly generated within the solid layers such that the three-dimensional permanent magnet made up of the plurality of solid layers exhibits localized regions of residual stress.

9. The method of claim 1 wherein the powder feed material comprises, by weight, greater than or equal to 90% iron (Fe).

10. The method of claim 9 wherein the powder feed material comprises at least one nonmetal element selected from the group consisting of nitrogen, carbon, or boron, and wherein each particle of the powder feed material comprises the at least one nonmetal element in an amount, by weight, less than or equal to 5%.

11. The method of claim 1 wherein the fused iron nitride material comprises, on an atomic basis, greater than 10% nitrogen and the magnetic $Fe_{16}N_2$ phase exhibits a body-centered tetragonal (bct) crystal structure.

12. The method of claim 1 wherein the three-dimensional permanent magnet comprises a solid exterior and a porous interior enclosed within the solid exterior.

13. The method of claim 1 including:
   after step (f), exposing the three-dimensional permanent magnet to gaseous nitrogen, carbon, or boron to increase the respective concentration of nitrogen, carbon, or boron within the solid layers of fused iron nitride material.

14. The method of claim 13 wherein the three-dimensional permanent magnet comprises a plurality of flow-through channels defined by walls having wall surfaces, and wherein, when the three-dimensional permanent magnet is exposed to gaseous nitrogen, carbon, or boron, the gaseous nitrogen, carbon, or boron is directed through the flow-through channels in the three-dimensional permanent magnet such that the gaseous nitrogen, carbon, or boron contacts the wall surfaces and promotes dissolution of nitride, carbide, or boride ions into the solid layers of fused iron nitride material.

15. A method of manufacturing a three-dimensional permanent magnet using a powder bed fusion additive manufacturing technique, the method comprising:
   (a) providing an iron-based powder feed material;
   (b) distributing a layer of the powder feed material over a solid substrate;
   (c) scanning selective regions of the layer of the powder feed material with a laser beam to locally melt the selective regions and form a pool of molten feed material, the selective regions of the layer corresponding to a cross-section of a three-dimensional object being formed;

(d) exposing the pool of molten feed material to gaseous nitrogen to dissolve nitride ions into the pool of molten feed material;

(e) terminating the laser beam to cool and solidify the pool of molten feed material into a solid layer of fused iron nitride material; and (f) repeating steps (b) through (e) to form a three-dimensional object made up of a plurality of solid layers of fused iron nitride material, wherein the fused iron nitride material comprises, on an atomic basis, greater than 10% nitrogen, wherein the fused iron nitride material comprises a magnetic $Fe_{16}N_2$ phase exhibiting a body-centered tetragonal (bct) crystal structure, and wherein, during formation of the plurality of solid layers of fused iron nitride material, thermal gradients are repeatedly generated within the solid layers such that the three-dimensional object exhibits localized strains in the range of 0.5% to 1%, and wherein the localized strains promote formation and stabilization of the magnetic $Fe_{16}N_2$ phase.

16. The method of claim 15 wherein the three-dimensional object is trapezoid-shaped, or helical in shape.

17. A method of manufacturing a three-dimensional permanent magnet made of a bulk nitride-containing material using a powder bed fusion additive manufacturing technique, the method comprising:

(a) providing a powder feed material including iron (Fe);

(b) distributing a layer of the powder feed material over a solid substrate;

(c) scanning selective regions of the layer of the powder feed material with a laser beam to locally melt the selective regions and form a pool of molten feed material, the selective regions of the layer corresponding to a cross-section of a three-dimensional object being formed;

(d) exposing the pool of molten feed material to gaseous nitrogen to dissolve nitride ions into the pool of molten feed material to produce a molten solution of iron and nitrogen;

(e) terminating the laser beam to cool and solidify the molten solution into a solid layer of fused iron nitride material; and (f) repeating steps (b) through (e) to form a three-dimensional permanent magnet made up of a plurality of solid layers of fused iron nitride material, wherein the fused iron nitride material comprises a magnetic $Fe_{16}N_2$ phase, and wherein, during formation of the plurality of solid layers of fused iron nitride material, thermal gradients are repeatedly generated within the solid layers such that the three-dimensional permanent magnet exhibits localized strains in the range of 0.5% to 1%, and wherein the localized strains promote formation and stabilization of the magnetic $Fe_{16}N_2$ phase.

18. The method of claim 17 wherein the fused iron nitride material comprises, on an atomic basis, greater than 10% nitrogen and the magnetic $Fe_{16}N_2$ phase exhibits a body-centered tetragonal (bct) crystal structure.

* * * * *